United States Patent [19]

Clingenpeel

[11] 4,184,051
[45] Jan. 15, 1980

[54] DIGITAL MEMORY PROVIDING FIXED AND VARIABLE DELAYS IN A TASI SYSTEM

[75] Inventor: Glenn R. Clingenpeel, Northglenn, Colo.

[73] Assignee: Storage Technology Corporation, Louisville, Colo.

[21] Appl. No.: 863,903

[22] Filed: Dec. 23, 1977

[51] Int. Cl.² ............................................... H04J 6/02
[52] U.S. Cl. ................................................. 179/15 AS
[58] Field of Search .......... 179/15 AS, 15 A, 15 BW, 179/15 BA, 15 BV, 15 AP, 15 BY, 1 SA

[56] References Cited

U.S. PATENT DOCUMENTS

| | | | |
|---|---|---|---|
| 3,644,680 | 2/1972 | Amano et al. | 179/15 AS |
| 3,836,719 | 9/1974 | Clark | 179/15 AS |
| 4,012,595 | 3/1977 | Ota | 179/15 AS |
| 4,048,447 | 9/1977 | Matluta | 179/15 AS |

Primary Examiner—Thomas A. Robinson

Attorney, Agent, or Firm—Woodcock, Washburn, Kurtz & Mackiewicz

[57] ABSTRACT

A time assignment speech interpolation system has a random access memory which provides both a fixed and a variable delay between an input speech channel and a transmission facility. Digital samples of the signal detected on an input speech channel are stored for a fixed time in a portion of the memory in order to provide time for switching without clipping and for generation of a channel identifying symbol. If a transmission facility is available, the sample is read out of memory after the fixed delay and reconstituted into an analog signal which is transmitted on the available facility. If no transmission facility is available, the samples are read out of memory after the fixed delay and written into another portion of memory which stores them for variable times until a transmission facility is available. The portions of the memory assigned to providing variable delay are paired. Starting addresses are at the two extremes of memory locations in a pair, and successive memory locations extend toward the other extreme starting address.

9 Claims, 5 Drawing Figures

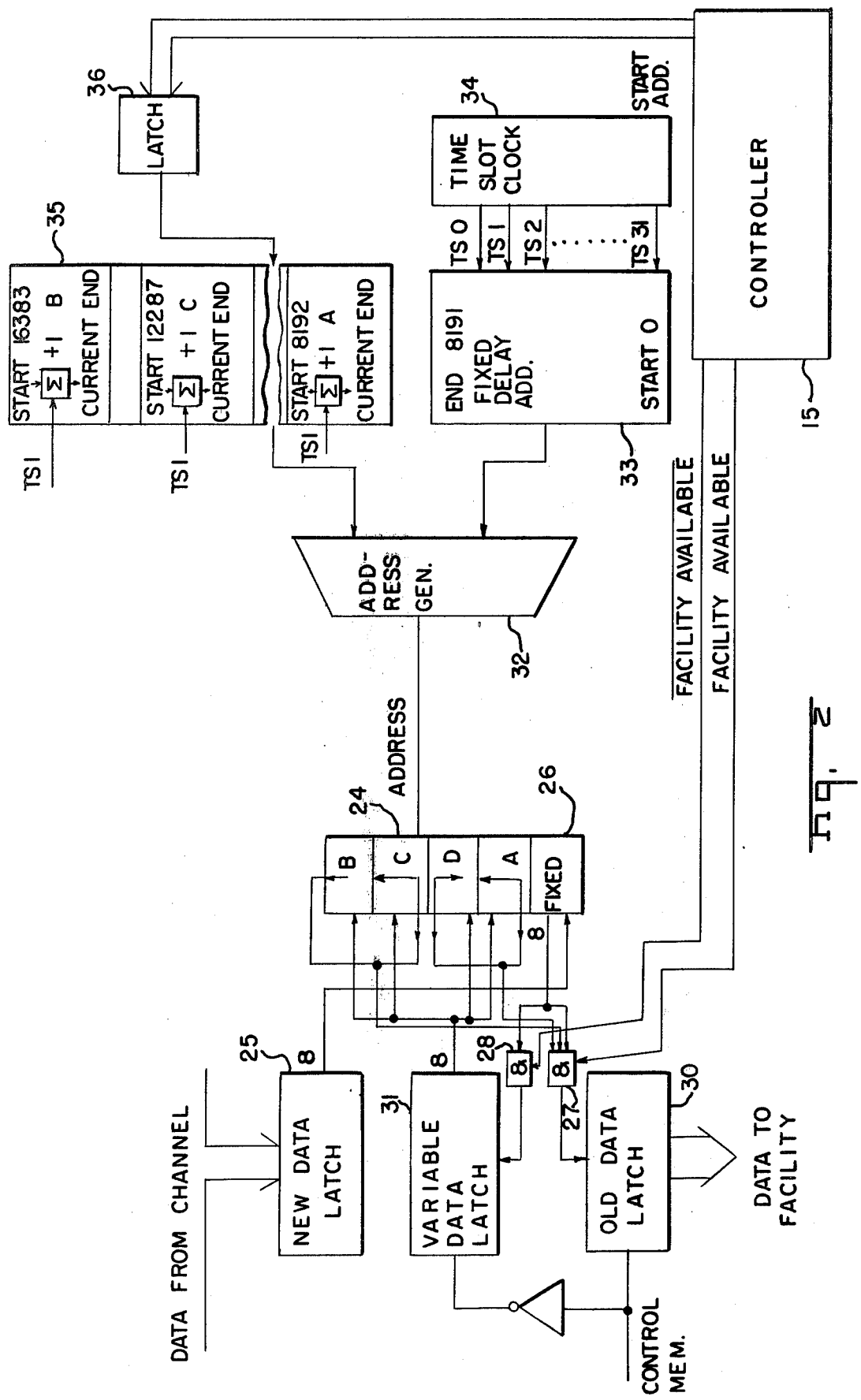

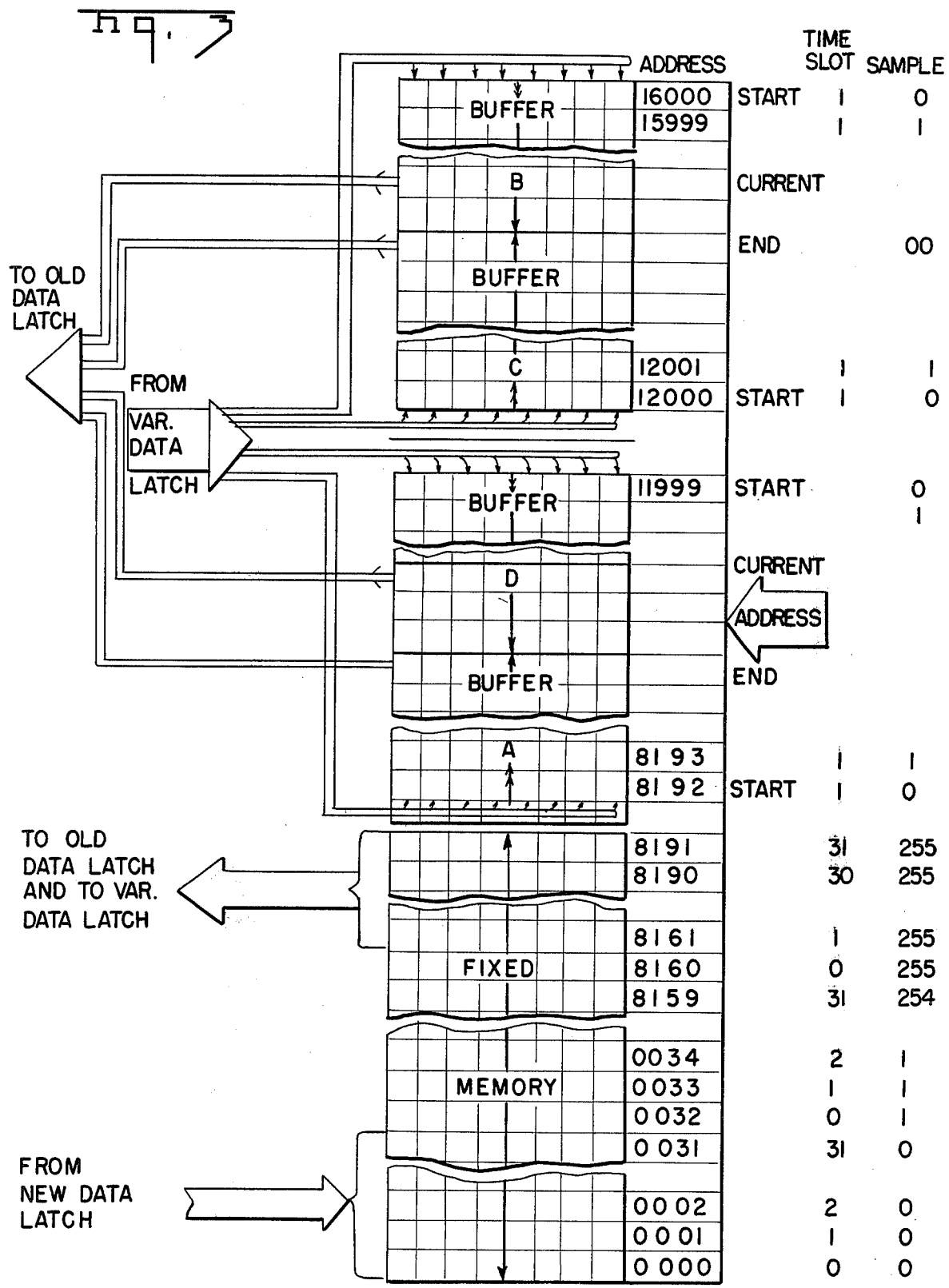

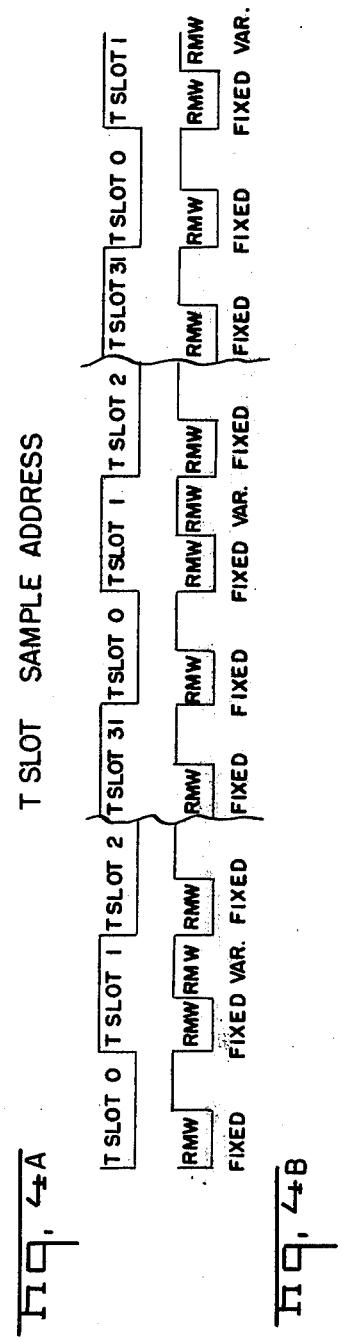

DIGITAL MEMORY PROVIDING FIXED AND VARIABLE DELAYS IN A TASI SYSTEM

BACKGROUND OF THE INVENTION

This invention relates to time assignment speech interpolation systems, and more particularly to a random access memory providing fixed and variable delays for such a system.

Because of the extremely high cost of communications transmission facilities, e.g. satellite channels and undersea transmission links, the prior art has sought various means to maximize the efficiency of existing transmission facilities. One such system is known as a time assignment speech interpolation (TASI) system. In a typical TASI system, calls from n callers are transmitted across, for example n/2 transmission facilities to a remote location. At that location, the n/2 facilities are connected to n output speech channels. TASI systems operate on the assumption, verified as a statistical fact, that at any given time not all callers will wish to talk simultaneously. In fact, as a general rule, callers are actively talking less than half of the time the talker and the listener are interconnected. Accordingly, TASI systems may be defined as switching systems which interconnect talker and listener only when the talker is actively speaking, provided there is a transmission facility available at that time.

"OVER-ALL CHARACTERISTICS OF A TASI SYSTEM" by J. M. Fraser, D. B. Bullock and N. G. Long, The Bell System Technical Journal, July 1962, pages 1439-1473 describes a TASI system. Such systems have been successfully used on undersea cables, for example, where a relatively large number of transmission facilities are available. Typically, thirty-six transmission facilities are available to transmit signals from seventy-four speech channels.

Another transmission facility, referred to as the order wire or control channel, is used to transmit disconnect signals to the remote location. FIG. 3 of the aforementioned article shows such a system.

RELATED APPLICATIONS

Copending application Ser. No. 863,890, filed Dec. 23, 1977, Thomas Cannon et al describes an improved TASI System in which the need for an order wire is eliminated. A symbol representing the input speech channel to which the transmission facility has been assigned is generated and transmitted prior to the signal. The invention of the Cannon et al application provides a fixed delay between the input speech channel and the transmission facility. This fixed delay provides an interval in which the symbol is generated and switching is performed without clipping the signal.

Copending application Ser. No. 863,902, filed Dec. 23, 1977, William A. Morgan describes an improved TASI System in which a variable delay is provided between the inut speech channel and the transmission facility. This variable delay is applied when no transmission facility is available. The delay extends until a facility becomes available. This prevents the loss of signals which would otherwise occur when no transmission facility is available. This situation, commonly referred to as "freeze out", is a particular problem in TASI systems with a small number of transmission facilities.

It is an object of the present invention to provide both the fixed and the variable delay in a random access memory.

SUMMARY OF THE INVENTION

In accordance with this invention, a time assignment speech interpolation system has a random access memory in which samples of detected signals are stored until the necessary switching and symbol generation are performed and until a transmission facility is available. When a transmission facility is available, the samples are reconstituted and transmitted on a transmission facility to a remote location.

In accordance with an important aspect of this invention, the portion of the memory assigned to provide the variable delay is divided into pairs of buffers which fill from the high address end and the low address end respectively. This provides optimum memory length flexibility for any given memory length by allowing each of the two variable capacity buffers to use any memory capacity not already used by the other buffer.

In accordance with another important aspect of this invention, the allocation of the memory to fixed and variable buffers can be changed to provide the most efficient utilization of memory for a particular system configuration.

It has been proposed to use TASI systems of the type under consideration in communication networks where there are as few as four transmission facilities. In such a system, a large amount of memory must be allocated to provide a variable buffer which will hold samples until a transmission facility becomes available. On the other hand, when there are a large number of transmission facilities in the system, the required capacity of the variable buffers is not as large, and it can be configured in a different way to provide most efficient usage. The use of a random access memory in accordance with this invention provides flexibility to most efficiently utilize the memory.

The foregoing and other objects, features and advantages of the invention will be better understood from the following more detailed description and appended claims.

DESCRIPTION OF THE DRAWINGS

FIG. 2 is a block diagram of the present invention;
FIG. 3 shows the random access memory in more detail;
FIG. 4A depicts the output of the time slot clock;
and
FIG. 4B depicts the memory read and write operations within each time slot.

DESCRIPTION OF THE PREFERRED EMBODIMENT

Figure 1:
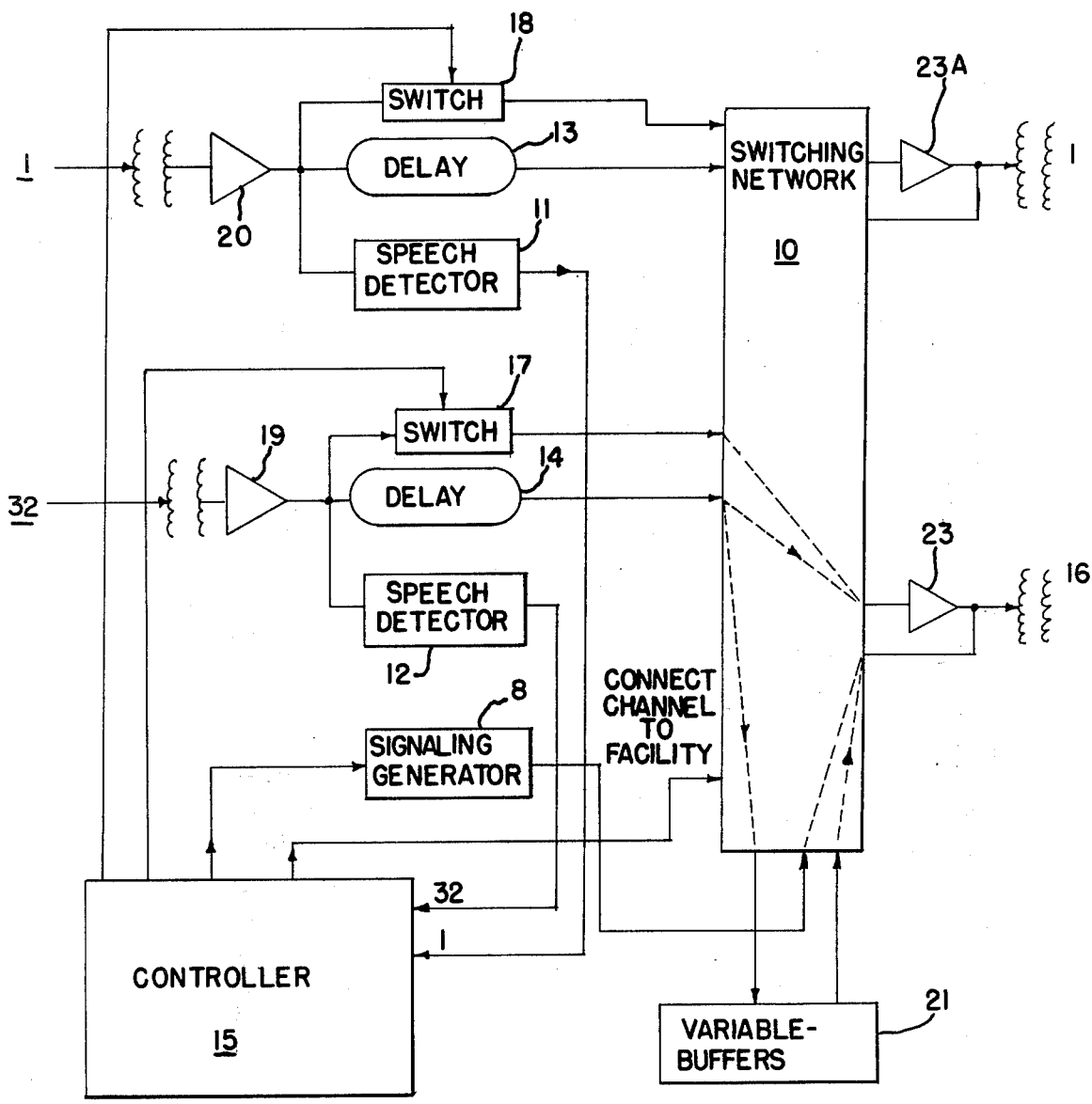
FIG. 1 is a block diagram of the transmitting side of a TASI System.

Before describing the present invention, the sending side of a TASI system will first be described with reference to FIG. 1.

In this example, there are 32 input speech channels of which only channel 1 and channel 32 have been shown. As is conventional in such systems, signals from the input speech channel are applied to switching network 10 which selectively connects an input speech channel to an available transmission facility 1 . . . 16. Only transmission facilities 1 and 16 have been shown. Typically, there are half as many transmission facilities as there are input speech channels. Speech detectors 11, 12 and others, detect the presence of a signal on an input channel. In response to the detection of a signal on the input channel, a controller 15 operates switching network 10 to connect the input speech channel to an available transmission facility. FIG. 1 shows input speech channel 32 connected to transmission facility 16.

Fixed delays 13, 14 and others are connected between each input speech channel and switching network 10. The delays 13 and 14 provide a time interval during which a symbol from signalling generator 8 is applied to the transmission facility. This symbol from signalling generator 8 identifies the input speech channel to which the transmission facility has been assigned. For example, assume transmission facility 16 has been assigned to input speech channel 32. Signalling generator 8 generates a symbol representing input channel 32. This is applied to the transmission facility 16 before the speech signal, sometimes referred to as a speech burst. The delay 14 provides the time interval required to insert the symbol before the speech signal.

Switches 17 and 18 are in a circuit in parallel with the fixed delay. These provide the capability of switching the fixed delay out of the sending side of the system after the first speech burst as long as a transmission facility is connected to that channel.

Signals from the input channels are converted into digital (P.C.M.) form by means of the analog-to-digital converters 19 and 20. These digital signals may be stored for variable times in variable delay buffers 21, and then transmitted on a facility when a facility becomes available. This is described in the aforementioned application of William A. Morgan. The digital signals are reconstituted back to analog by the digital-to-analog converters 23 and 23A before the signals are applied to the transmission facilities.

In accordance with the present invention, the fixed delays 13 and 14 and the variable delay buffers 21 are provided in a single random access memory 24 which is shown in FIG. 2.

Digital samples from a channel are transferred from the channel to the new data latch 25. These eight bit samples are then transferred to a fixed portion 26 of random access memory 24. The samples are stored in the fixed portion 26 for a fixed time. Thereafter, the samples are applied to gating means, including AND circuits 27 and 28 which respond to controller 15. If a transmission facility is available AND gate 27 is enabled. In this case, digital samples are applied to old data latch 30 from which they are transferred to the digital-to-analog converter to be reconstituted into an analog signal which is transmitted on an available facility.

If no transmission facility is available, AND gate 28 is enabled. In this case, samples are first set into the variable data latch 31 and then transferred to one of the buffers A, B, C or D in the variable portion of random access memory 24. The buffers are paired. As shown in FIG. 2, buffers B and C are paired and A and D are paired. The buffers are filled from the high address end and the low address end respectively. That is, buffer B is filled from the high address end, and buffer C is filled from the low address end. Buffer D is filled from the high address end and buffer A is filled from the low address end. The dividing line between buffers in a pair is at a variable location. This provides optimum memory length flexibility by allowing each buffer to use memory capacity not already used by the other buffer in the pair.

Addresses for storing samples in and reading samples from random access memory 24 are generated by the address generator 32. Addresses for the fixed portion of memory are generated by the fixed delay address generator 33. This responds to a time slot clock 34 which generates a signal defining a plurality of time intervals which are applied to fixed delay generator 33. In the example under consideration, the clock 34 generates thirty-two different time slots denoted TS 0, TS 1 . . . TS 31. The cycle is repetitive. Address generator 33 generates memory addresses in cycles which are repetitive after a fixed delay. The addresses are applied to the fixed portion 26 of memory 24 so that successive samples are stored in memory locations and read out of that location after a fixed delay.

When a sample is read out of the fixed portion 26 of memory, it may be stored in the variable portion of memory at an address which is generated by the variable buffer control memory 35. In the example under consideration, the starting address of buffer A is memory location 8192, the starting address of buffer D is 12287, the starting address of buffer C is 12288 and the starting address of buffer B is 16384. Controller 15 sets a starting address of one of the four buffers into latch 36. Thereafter, the starting address is incremented or decremented by 1 by the time slot clock 34. In this manner, a current address is generated for the storage or readout of samples from the variable portion of the memory.

FIG. 3 shows the 8×16K random access memory 24 in more detail. The fixed portion of memory includes the eight-bit storage locations having addresses from 0000 to 8191. In the example under consideration, the thirty-two time slots from the time slot clock are used to poll each of the thirty-two channels. Two hundred fifty-six memory locations are provided for each channel. The first sample from the first channel is stored in location 0000. The first sample from the second channel is stored in location 0001 . . . , the first sample from channel 32 is stored at address 0031. The second sample from channel 1 is stored at address 0032. The second sample from channel 2 is stored at address 0033 and so on. The two hundred fifty-sixth sample from channel 1 is stored at address 8160. Thereafter, the first sample from channel 1 is read out of storage location 0000, and the next sample is stored therein. Each sample remains in memory for a fixed delay of 32 milliseconds.

In the variable portion of memory, address locations 8192 through 12287 are allocated to the variable buffers A and D. Buffer A is filled starting with address 8192 and buffer D is filled starting with address 12287. Buffer C is filled starting with address 12288 and buffer D is filled starting with storage location 16384.

Upon selection of a buffer, it expands with each new sample transferred from fixed memory until a facility becomes available. If the end addresses of both buffers come together before a transmission facility becomes available, speech will be lost, but it can be statistically shown that this occurs infrequently.

FIG. 4A shows the time slots generated by the clock 34.

FIG. 4B indicates the read, modify and write operations (RMW) which are performed during each time slot. The operation of the system will now be described.

At the beginning of each time slot, a PCM digital sample from a channel is latched into new data latch 25. A memory read operation is initiated. If a transmission facility is available, a sample is transferred from a location in the fixed portion 26 of memory to the old data latch 30. During this same time slot, the sample in the new data latch is written into that same storage location, thereby replacing the oldest speech sample with the newest.

The operation is different if a variable buffer is in use. This can be because no transmission facility is currently available, or because no transmission facility was available at the start of some previous talk burst, and the buffer inserted then is still in use (because no sufficiently long pause has occurred for removing it).

When a buffer is in use, the beginning of a time slot latches a sample from the channel into the new data latch 25 just as before. A memory read operation is performed in the fixed delay section and the sample read out is latched into the variable data latch 31. Variable buffer control memory 35 generates the address for the current location of the buffer being used. During the last half of the current time slot, a read operation is performed at this memory location. The sample read out is stored in the old data latch 30. If the buffer is in its expanding mode (no facility is available, and space for expansion is still available), this sample dies in the data latch. If the buffer is in its closed mode (a facility has been assigned to the speech in the buffer, and the buffer acts as a fixed delay), the sample read out at this time is eventually passed to the facility.

The final action in the last half of the time slot is to write the current address of the variable buffer with the sample stored in the variable data latch 31. This can be the same operation whether the buffer is expanding or closed.

The invention as described above has four variable buffers and a fixed memory with 8K storage locations. However, one of the important advantages of the present invention is that the number of buffers and the amount of storage allocated to fixed memory can be easily changed. The system described above has thirty-two channels, but in practice the number of channels varies. A system of this type can have as few as eight channels. The allocation of memory locations to fixed and variable buffers can be changed to most efficiently use the memory. Where the number of transmission facilities is small, a larger capacity variable buffer should be provided to prevent freeze out.

As an example of the manner in which the allocation of memory is changed, depending upon the number of channels, the following lists the allocation of a 16K memory for system configurations of 32, 16 and 8 channels:

| NUMBER OF CHANNELS | FIXED MEMORY ALLOCATION | VARIABLE MEMORY ALLOCATION | NUMBER OF BUFFERS |
|---|---|---|---|
| 32 | 8192 | 8197 | 4 |
| 16 | 4096 | 12288 | 2 or 4 |
| 8 | 2048 | 14336 | 2 |

With only eight channels, it has been found that the best configuration is to provide two buffers with a combined capacity of 14K. In this case, it is not likely that there will be speech on more than two channels at a time when no transmission facility is available. Therefore, providing only two buffers is sufficient. However, when no transmission facility is available, the wait for a facility is likely to be long. Hence, providing a long buffer length, up to 14K, is useful.

On the other hand, when there are thirty-two channels, it is likely that there will be more channels requiring buffering while waiting for a transmission facility to become available. Therefore, the variable memory is divided into four buffers. Each buffer has a maximum length of only 4K, but this is sufficient because it can be shown statistically that the wait for an available facility will be shorter than in systems where there are fewer channels.

The following are examples of components which have been used in one implementation of the invention:

| | |
|---|---|
| Controller 15 | Intel 8085 Microprocessor |
| RAM | MR 4116 |
| Latch 25, 30, 31 and 36 | 74LS374 |
| AND Gates 27 & 28 | 74LSXX Logic Family |
| Address Generators 32 & 33 | 74LS257, 74LS1694 |
| Clock 34 | Crystal Oscillator and 74LSXX Family |
| Control Memory 35 | Intel 2101A |

While a particular embodiment of the invention has been shown and described, various modifications are within the true spirit and scope of the invention. The appended claims are intended to cover all such modifications.

What is claimed is:

1. A time assignment speech interpolation system comprising:
   means for sampling signals detected on each input speech channel;
   a random access digital memory connected between said input speech channels and transmission facilities extending to a remote location, said samples being stored in a fixed portion of said memory for a fixed time;
   an address generator for generating addresses in a variable portion of said memory and in said fixed portion of said memory,
   control means for storing said samples in said variable portion of memory for variable times until a transmission facility is available; and
   means for reconstituting said samples to signals for transmission on a transmission facility.

2. The system recited in claim 1 further comprising:
   a clock generating a plurality of time intervals, said time intervals being applied to said address generator to generate different memory addresses during each succeeding clock interval in a cycle which is repetitive after a number of time intervals making up said fixed delay, said addresses being applied to said memory so that successive samples are stored in memory locations and read out of that memory location after a fixed delay.

3. The system recited in claim 2 wherein said samples are read out of a memory location after said fixed delay and read into said variable portion of memory where they are stored until a transmission facility is available.

4. The system recited in claim 1 wherein said variable portion of memory is divided into pairs of buffers which are filled from the high address end and the low address end respectively.

5. The system recited in claim 1 further comprising:
   gating means, the output of said fixed portion of said memory being applied to said gating means, the output of said gating means being selectively applied to either a transmission facility or to said variable portion of memory, said gating means being responsive to said control means for selecting said variable portion of memory when a transmission facility is not available.

6. In a communication system of the type comprising:
switching means for applying signals from a plurality of input speech channels to a lesser plurality of transmission facilities;
a speech detector coupled to each input speech channel for detecting the presence of signals on that channel;
control means responsive to said speech detectors for controlling said switching means to assign an input speech channel to an available transmission facility when a signal is detected on that channel;
a fixed delay between each input speech channel and said first switching means; and
a variable delay between each input speech channel and said switching means, said control means controlling said variable delay so that voice signals are stored therein until a transmission facility is available; the improvement comprising:
a random access memory, said samples being stored in successive locations in said memory to provide said fixed and said variable delay.

7. The system recited in claim 6 further comprising:
an address generator for generating a starting address at which an initial sample from a speech channel is stored and the current address of the successive locations at which samples are stored, said memory having a plurality of starting addresses so that variable delays can be provided for a plurality of input speech channels.

8. The system recited in claim 7 wherein two starting addresses are at the two extremes of memory locations assigned to said variable delay, and wherein successive memory locations extend from a starting address toward the other extreme starting address.

9. The system recited in claim 6 wherein said control means assigns speech channels to storage locations in different portions of said random access memory to provide both said fixed and said variable delay.

* * * * *

UNITED STATES PATENT AND TRADEMARK OFFICE
CERTIFICATE OF CORRECTION

PATENT NO. : 4,184,051

DATED : January 15, 1980

INVENTOR(S) : Glenn R. Clingenpeel

It is certified that error appears in the above—identified patent and that said Letters Patent are hereby corrected as shown below:

Column 6, line 14, after "RAM" insert -- 24 --.

Signed and Sealed this

Tenth Day of June 1980

[SEAL]

Attest:

SIDNEY A. DIAMOND

Attesting Officer

Commissioner of Patents and Trademarks